United States Patent [19]

Tsuiki et al.

[11] Patent Number: 6,032,117
[45] Date of Patent: Feb. 29, 2000

[54] REPRODUCTION DEVICE OUTPUTTING COMBINED SEQUENCE OF USER-SPECIFIC AND USER INDEPENDENT VOICE MESSAGE DATA

[75] Inventors: Hideo Tsuiki; Kikuji Miyazaki, both of Tokyo, Japan

[73] Assignee: NEC Corporation, Tokyo, Japan

[21] Appl. No.: 08/976,568

[22] Filed: Nov. 24, 1997

[30] Foreign Application Priority Data

Nov. 27, 1996 [JP] Japan ................................ 8-316657

[51] Int. Cl.[7] .............................. G10L 5/02; G11B 31/00
[52] U.S. Cl. ...................... 704/258; 704/270; 379/67.1
[58] Field of Search ................................. 704/258, 270; 379/67.1; 455/413

[56] References Cited

U.S. PATENT DOCUMENTS

| | | | |
|---|---|---|---|
| 4,305,131 | 12/1981 | Best ........................................ | 345/327 |
| 4,918,322 | 4/1990 | Winter et al. ........................... | 379/67.1 |
| 5,029,200 | 7/1991 | Haas et al. ............................. | 379/88.18 |
| 5,444,767 | 8/1995 | Goetcheus et al. .................... | 379/67.1 |
| 5,821,874 | 10/1998 | Parvulescu et al. .................. | 340/825.44 |

FOREIGN PATENT DOCUMENTS 5-19779   1/1993   Japan ............................... G10L 3/00

OTHER PUBLICATIONS

Octel Communications Corporation, Octel User Reference Manual, p. 23, Nov. 1994.

Lawrence R. Rabiner and Ronald W. Schafer, Digital Processing of Speech Signals, p. 465, 1978.

*Primary Examiner*—David R. Hudspeth
*Assistant Examiner*—Tálivaldis Ivars Šmits
*Attorney, Agent, or Firm*—Foley & Lardner

[57] ABSTRACT

A voice reproduction device including a voice data accumulation unit, a voice data editing unit for editing and outputting voice data accumulated at the voice data accumulation unit and a voice reproduction unit for reproducing voice from voice data output from the voice data accumulation unit and outputting the voice, the voice data accumulation unit including a common voice data memory for storing voice data of a voice piece common to every user and an individual voice data memory for storing voice data prepared individually for each user. A branch code including information designating voice data of utterances to be read from the individual voice data memory is inserted between voice data of utterances stored in the common voice data memory, with voice data editing unit controlling switching between operation of reading voice data from the common voice data memory and that of reading voice data from the individual voice data memory to sequentially output read voice data to the voice reproduction unit.

10 Claims, 6 Drawing Sheets

(A)

(B)

REPRODUCTION DEVICE OUTPUTTING COMBINED SEQUENCE OF USER-SPECIFIC AND USER INDEPENDENT VOICE MESSAGE DATA

BACKGROUND OF THE INVENTION

1. Field of the Invention

The present invention relates to a voice reproduction device for storing and reproducing voice when necessary and, more particularly, to a voice reproduction device for combining optimum voice data according to use conditions to generate and reproduce a voice message.

2. Description of the Related Art

Conventional voice reproduction devices which reproduce voice data stored in a memory in advance when necessary seem to be uniform to users because the contents and voice quality of a message generated by voice data are fixed. To young users, in particular, the voice sounds too uniform to draw users' full attention and therefore prevents improvement in efficiency of communication using voice information.

To solve these problems, a voice reproduction device is proposed which combines pieces of a message based on voice data to create and reproduce a voice message with a meaning. One of conventional voice reproduction devices of this kind is disclosed in Japanese Patent Laying-Open (Kokai) No. Heisei 5-19779, entitled "Voice Editing Device". The literature recites a device which includes a voice piece accumulation unit for accumulating a plurality of pieces of a voice message of a meaning which is to be edited and synthesized and selects pieces of a voice message with the same meaning at random or at will from the accumulated pieces to generate a series of voice messages with a signification, thereby giving variation to voice information to prevent uniformity of voice information.

The above-described conventional voice reproduction device is, however, incapable of creating a voice message corresponding to an individual user because voice pieces to be used in a message are still based on voice data accumulated in a memory in advance. It is therefore impossible to draw a user's attention to improve information communication efficiency satisfactorily.

For users of young age, for example, calling them by their names or voice messages created by incorporating pieces of voice whose quality is familiar to them into voice information can draw users' full attention. The above-described conventional voice reproduction device is, however, incapable of creating such a voice message and is accordingly not allowed to communicate voice information by means of an optimum voice message corresponding to each individual user.

SUMMARY OF THE INVENTION

An object of the present invention is to provide a voice reproduction device which reproduces voice information having information inherent to a user incorporated to draw a user's full attention to drastically improve communication efficiency.

According to one aspect of the invention, a voice reproduction device which stores voice data in advance and reads the voice data when necessary for reproducing voice, comprises voice data accumulating means for accumulating voice data of a voice message to be reproduced, voice data editing means for controlling the voice data accumulating means to edit and output voice data accumulated in the voice data accumulating means, and voice reproducing means for reproducing voice from voice data output from the voice data accumulating means and outputting the voice, wherein the voice data accumulating means comprises first voice data storing means for storing voice data of a voice piece common to every user, and second voice data storing means for storing voice data of a voice piece prepared individually for each user, and the voice data editing means controls switching between operation of reading voice data from the first voice data storing means and that of reading voice data from the second voice data storing means to sequentially output the read voice data to the voice reproducing means.

In the preferred construction, between voice data of the respective voice pieces stored in the first voice data storing means, a branch code is inserted which includes information designating voice data of a voice piece to be read from the second voice data storing means, and the voice data editing means comprises branch code detecting means for detecting a branch code from data read from the first voice data storing means, and read control means for, when a branch code is detected by the branch code detecting means, interrupting data reading from the first voice data storing means to conduct reading of voice data designated by the branch code among voice data stored in the second voice data storing means and after completing the reading of the voice data from the second voice data storing means, resuming data reading from the first voice data storing means.

In the preferred construction, between voice data of the respective voice pieces stored in the first voice data storing means, a branch code is inserted which includes information designating voice data of a voice piece to be read from the second voice data storing means, the branch code is a combination of data pieces which will not ordinarily occur among voice data of the respective voice pieces stored in the first voice data storing means, and the voice data editing means comprises branch code detecting means for detecting a branch code from data read from the first voice data storing means, and read control means for, when a branch code is detected by the branch code detecting means, interrupting data reading from the first voice data storing means to conduct reading of voice data designated by the branch code among voice data stored in the second voice data storing means and after completing the reading of the voice data from the second voice data storing means, resuming data reading from the first voice data storing means.

In another preferred construction, the voice reproduction device further comprises a buffer memory for temporarily holding voice data read from the first voice data storing means and then outputting the data to the voice reproducing means.

In another preferred construction, between voice data of the respective voice pieces stored in the first voice data storing means, a branch code is inserted which includes information designating voice data of a voice piece to be read from the second voice data storing means, and which further comprises a buffer memory with a storage capacity equivalent to the data size of the branch code for temporarily holding voice data read from the first voice data storing means and then outputting the data to the voice reproducing means, and wherein the voice data editing means comprises branch code detecting means for detecting a branch code from data read from the first voice data storing means, and read control means for, when a branch code is detected by the branch code detecting means, interrupting data reading from the first voice data storing means to conduct reading of voice data designated by the branch code among voice data stored in the second voice data storing means and after completing the reading of the voice data from the second voice data storing means, resuming data reading from the first voice data storing means.

In another preferred construction, between voice data of the respective voice pieces stored in the first voice data storing means, a branch code is inserted which includes information designating voice data of a voice piece to be read from the second voice data storing means, and the branch code is a combination of data pieces which will not ordinarily occur among voice data of the respective voice pieces stored in the first voice data storing means, and which further comprises a buffer memory with a storage capacity equivalent to the data size of the branch code for temporarily holding voice data read from the first voice data storing means and then outputting the data to the voice reproducing means, and wherein the voice data editing means comprises branch code detecting means for detecting a branch code from data read from the first voice data storing means, and read control means for, when a branch code is detected by the branch code detecting means, interrupting data reading from the first voice data storing means to conduct reading of voice data designated by the branch code among voice data stored in the second voice data storing means and after completing the reading of the voice data from the second voice data storing means, resuming data reading from the first voice data storing means.

In the above-mentioned construction, the voice reproduction device further comprises voice data synthesizing means for synthesizing voice data to be stored in the second voice data storing means.

In the above-mentioned construction, the voice reproduction device further comprises voice data synthesizing means for synthesizing voice data to be stored in the second voice data storing means, the voice data synthesizing means comprises a data base for storing unit voice data, information input means for receiving input of information for the synthesis of voice data, and voice synthesizing means for synthesizing voice data by using unit voice data stored in the data base based on information input from the information input means.

Also, the voice data editing means skips read of arbitrary voice data designated when necessary among voice data stored in the first voice data storing means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
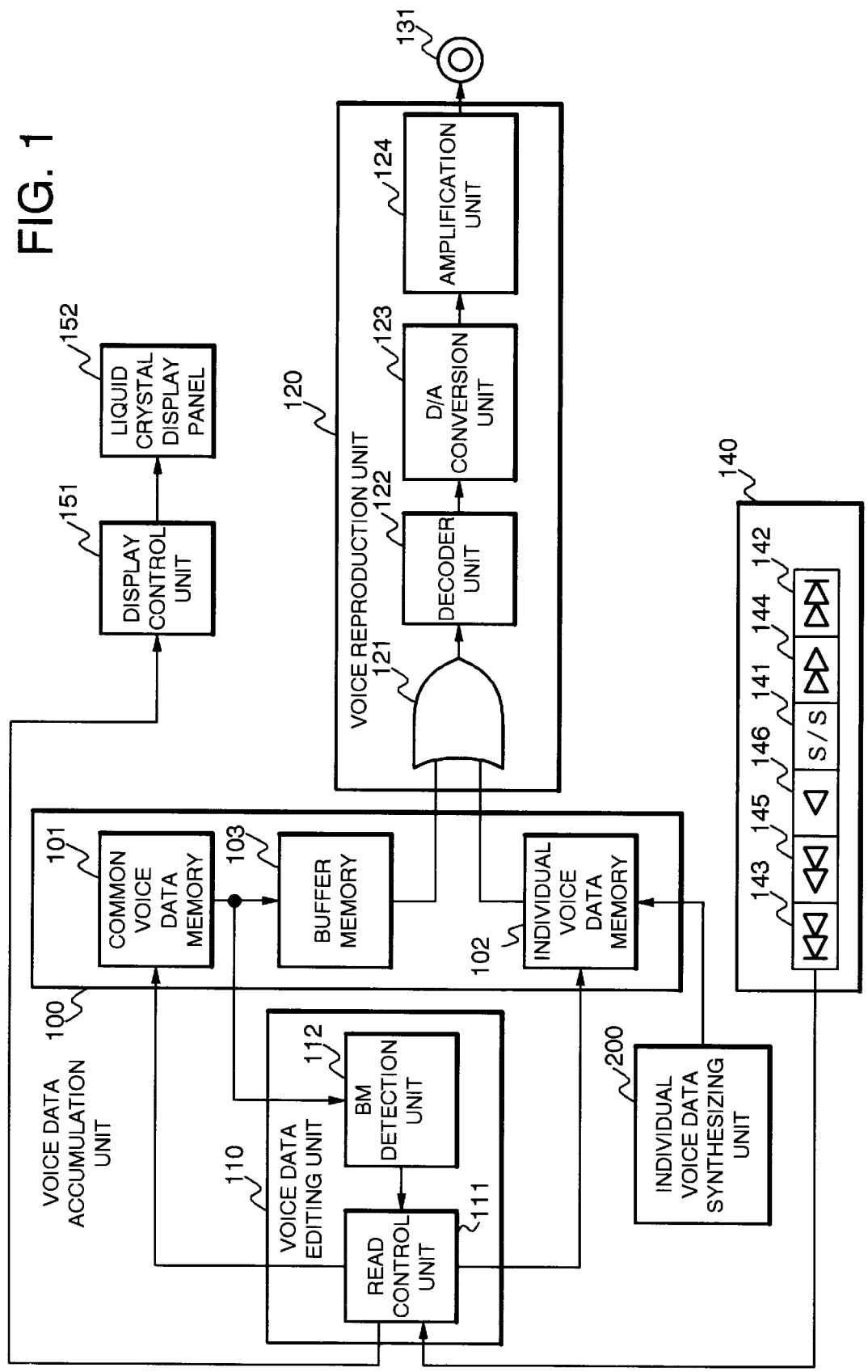
FIG. 1 is a block diagram showing structure of a voice reproduction device according to one embodiment of the present invention.

FIG. 1 is a block diagram showing structure of a voice reproduction device according to one embodiment of the present invention. The present embodiment will be described with respect to a voice reproduction device for use in providing a voice guidance to users of amusement parks, museums and other facilities.

With reference to FIG. 1, the voice reproduction device of the present embodiment includes a voice data accumulation unit 100 for accumulating voice data of a voice message to be reproduced, a voice data editing unit 110 for controlling the voice data accumulation unit 100 to edit and output voice data accumulated in the voice data accumulation unit 100, a voice reproduction unit 120 for reproducing voice from voice data output from the voice data accumulation unit 100 and outputting the voice, and an individual voice data synthesizing unit 200 for rewriting part of voice data accumulated in the voice data accumulation unit 100 when necessary. In FIG. 1, illustration is made only of a characteristic part of the structure of the present embodiment and that of the remaining common part is omitted.

The voice data accumulation unit 100, as illustrated in FIG. 1, includes a common voice data memory 101 for storing voice data of voice pieces common to every user out of voice constituting a voice message, a buffer memory 103 for temporarily holding voice data read from the common voice data memory 101, and an individual voice data memory 102 for storing voice data of voice pieces prepared individually for each user. Voice data read from the common voice data memory 101 is sent to the voice reproduction unit 120 through the buffer memory 103, while voice data read from the individual voice data memory 102 is sent directly to the voice reproduction unit 120. The voice reproduction device of the present embodiment combines voice data read from these voice data memories 101 and 102 to reproduce a voice message. More specifically, the device interrupts read of voice data from the common voice data memory 101 as required and reads and inserts individual voice data from the individual voice data memory 102 to generate a series of voice messages.

The common voice data memory 101 is implemented by a semiconductor memory such as a mask ROM (Read Only Memory) chip. Since the data memory is to store voice data common to every user, it only needs to serve for reading after storing necessary voice data in advance and therefore does not need to be a writable semiconductor memory. The individual voice data memory 102 is implemented by a semiconductor memory such as a RAM or a flash memory. Since the data memory is to store individual voice pieces corresponding to an individual user out of a voice message, it needs to be a semiconductor memory writable at random. Individual voice data is synthesized by the individual voice data synthesizing unit 200 and stored in the individual voice data memory 102 as will be described later. Every time a user changes, voice data of the individual voice data memory 102 is rewritten by the individual voice data synthesizing unit 200. The common voice data memory 101, for storing a 30-minute voice message, for example, has some 32-Mbit storage capacity. The individual voice data memory 102, since individual voice data is smaller in data size than common voice data, may have a storage capacity smaller than that of the common voice data memory 101. It may have, for example, a 1-Mbit to 2-Mbit storage capacity for storing individual voice data equivalent to a few minutes.

Figure 3:
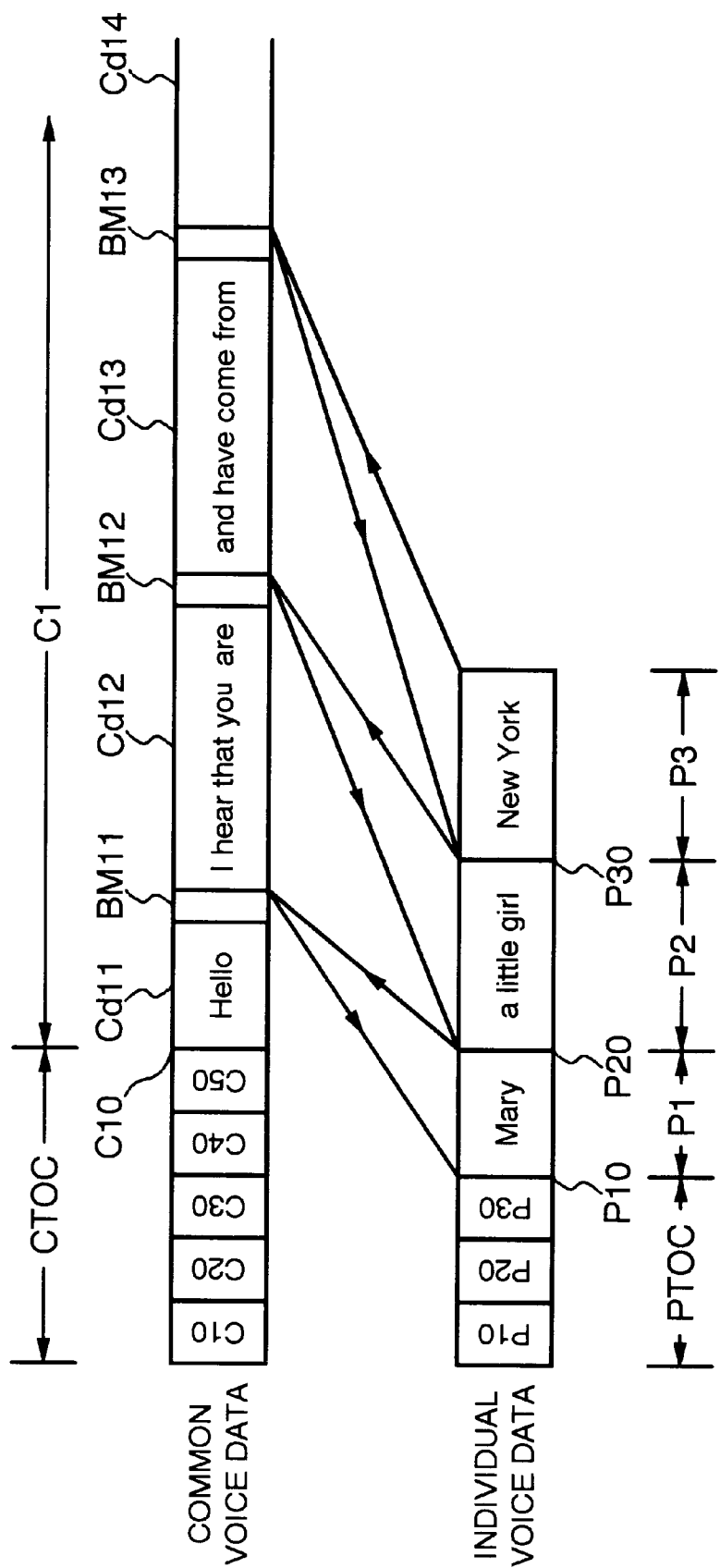
FIG. 3 is a diagram showing data structure of common voice data and individual voice data for use in the present embodiment.

FIG. 3 is a diagram showing structure of voice data to be stored in the common voice data memory 101 and the individual voice data memory 102. In the present embodiment, each voice data is coded in 16 Kbits/sec. based on LD-CELP system and is composed of 10-bit data pieces, one data piece of which is regarded as one word in the memory for convenience, sake. With reference to FIG. 3, disposed at the top of each voice data is TOC (Table of Contents) indicative of a table of contents of stored voice data. In FIG. 3, TOC of common voice data is denoted as CTOC and TOC of individual voice data is denoted as PTOC.

In the common voice data, at least one common voice data block C is disposed following CTOC. The common voice data block C is a block in which voice data corresponding to a sentence having one signification is stored. For example, with respect to each exhibit at a facility for which voice guidance is to be provided, data indicative of a voice message providing a guidance to the exhibit is stored as the common voice data block C. For five exhibits existing at a facility for which voice guidance is to be provided, five common voice data blocks C will be arranged. Arranged in CTOC are items to the same number as that of common voice data blocks C constituting the common voice data. Stored in each item are a name of its corresponding common voice data block C and address information indicative of a storage position of the data block C in the common voice data memory 101. The CTOC illustrated in FIG. 3 shows that five common voice data blocks C are stored in the common voice data and that the first common voice data block C1 is stored starting at the address C10 and the second common voice data block is stored starting at the address C20.

In the individual voice data, arranged following PTOC disposed at the top are individual voice data pieces P indicative of information inherent to an individual user such as given name (name or nickname), age, sex and address. In PTOC, similarly to CTOC, arranged are items to the same number as that of individual voice data pieces P constituting the individual voice data. Stored in each item is address information indicative of a storage position of the individual voice data piece P. In the PTOC illustrated in FIG. 3, three individual voice data pieces P are arranged, with the individual voice data piece P1 stored starting at the address P10, the individual voice data piece P2 at the address P20 and the individual voice data piece P3 at the address P30.

Figure 4:
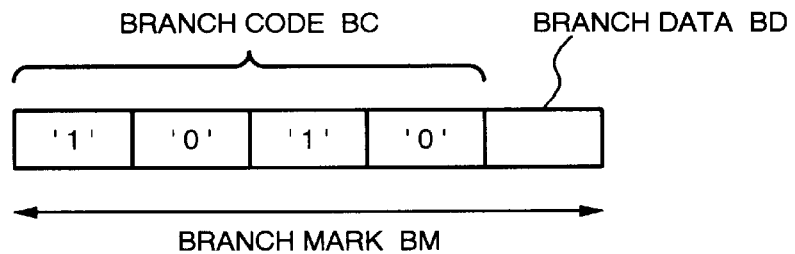
FIG. 4A is a diagram showing data structure of a branch mark to be disposed in the common voice data for use in the present embodiment.
FIG. 4B is a flow chart showing a procedure for detecting the branch mark of FIG. 4A from the common voice data.
Figure 4:
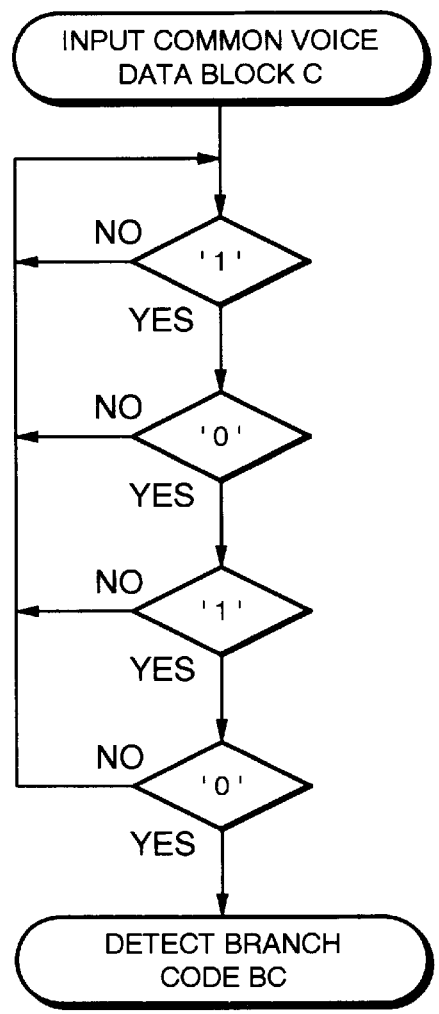

As illustrated in FIG. 3, the common voice data block C is structured to include a plurality of common voice data pieces Cd with branch marks BM interposed between the common voice data pieces Cd. The branch mark BM is composed of a branch code BC and a branch data BD as illustrated in FIG. 4A. Possible branch code BC is a combination of data pieces that will not ordinarily occur among a group of a series of common voice data pieces Cd. In the example shown in FIG. 4A, used is a code composed of four data pieces, in which a combination of a data piece whose 10 bits are all "1" and the subsequent data piece whose 10 bits are all "0" is arranged twice in succession. Thus structured branch code BC is detected, as shown in FIG. 4B, as a result of a check of data pieces sequentially from the top of an input common voice data block C made by a BM detection unit 112 which will be described later. The branch data BD is information for designating an individual voice data piece P to be read when a branch mark BM is detected to interrupt read of common voice data. The branch data BD of the branch mark BM11, for example, designates the individual voice data piece P1 as an individual voice data piece to be read.

The buffer memory 103 has a storage capacity of four-word length equivalent to the data size of the branch code BC shown in FIG. 4A. Temporarily storing the common voice data block C read from the common voice data memory 101 in the buffer memory 103 and then outputting the same to the voice reproduction unit 120 prevents reproduction of the branch mark BM as voice.

The voice data editing unit 110, as shown in FIG. 1, includes a read control unit 111 for controlling voice data reading from the common voice data memory 101 and the individual voice data memory 102 in the voice data accumulation unit 100, and a BM detection unit 112 for detecting a branch mark BM from common voice data read from the common voice data memory 101. The read control unit 111, which is implemented, for example, by program-controlled CPU and internal memory such as a RAM, controls switching between read of the common voice data block C from the common voice data memory 101 and read of the individual voice data piece P from the individual voice data memory 102. The common voice data block C read from the common voice data memory 101 is sent to the buffer memory 103 and the BM detection unit 112. The BM detection unit 112, which is implemented, for example, by program-controlled CPU and internal memory such as a RAM, when detecting a branch mark BM from the common voice data block C sent from the common voice data memory 101, notifies the read control unit 111 of the detection.

Operation of the read control unit 111 and the BM detection unit 112 will be specifically described with reference to FIG. 3. The read control unit 111 first controls operation such that the common voice data block C1 is read from the common voice data memory 101. Then, when read of a common voice data piece Cd11 is completed and the BM detection unit 112 detects a branch mark BM11, the read control unit 111 interrupts the read of the common voice data block C1 from the common voice data memory 101 to start read of the individual voice data piece P1 from the individual voice data memory 102. Upon completion of the read of the one individual voice data piece P1, the read control unit 111 again controls operation to start read of the common voice data block C from the common voice data memory 101. In this case, read of a common voice data piece Cd12 located right behind the branch mark BM11 is conducted. Then, when the read of the common voice data piece Cd12 is completed and the BM detection unit 112 detects a branch mark BM12, the read control unit 111 again interrupts the read of the common voice data block C1 from the common voice data memory 101 to start read of the individual voice data piece P2 located right behind the individual voice data piece P1 from the individual voice data memory 102. Read of a common voice data piece Cd and an individual voice data piece P is thus repeated alternately in response to the detection of a branch mark BM.

The voice reproduction unit 120, as illustrated in FIG. 1, includes an OR gate 121 for receiving input of voice data from the buffer memory 103 and the individual voice data memory 102 in the voice data accumulation unit 100, a decoder unit 122 and a digital-analog conversion unit 123 for converting voice data applied to the OR gate 121 into a voice signal, and an amplification unit 124 for amplifying a voice signal. The OR gate 121 combines a common voice data piece Cd applied through the buffer memory 103 and an individual voice data piece P applied through the individual voice data memory 102 into one series of voice data and sends the series of data to the decoder unit 122. The decoder unit 122 converts the voice data applied through the OR gate 121 into voice data of 64 Kbits/sec. The digital-analog conversion unit 123 converts the voice data converted by the decoder unit 122 into a voice signal. The amplification unit 124 amplifies the voice signal converted by the digital-analog conversion unit 123 and outputs the amplified signal through an output terminal 131.

Figure 2:
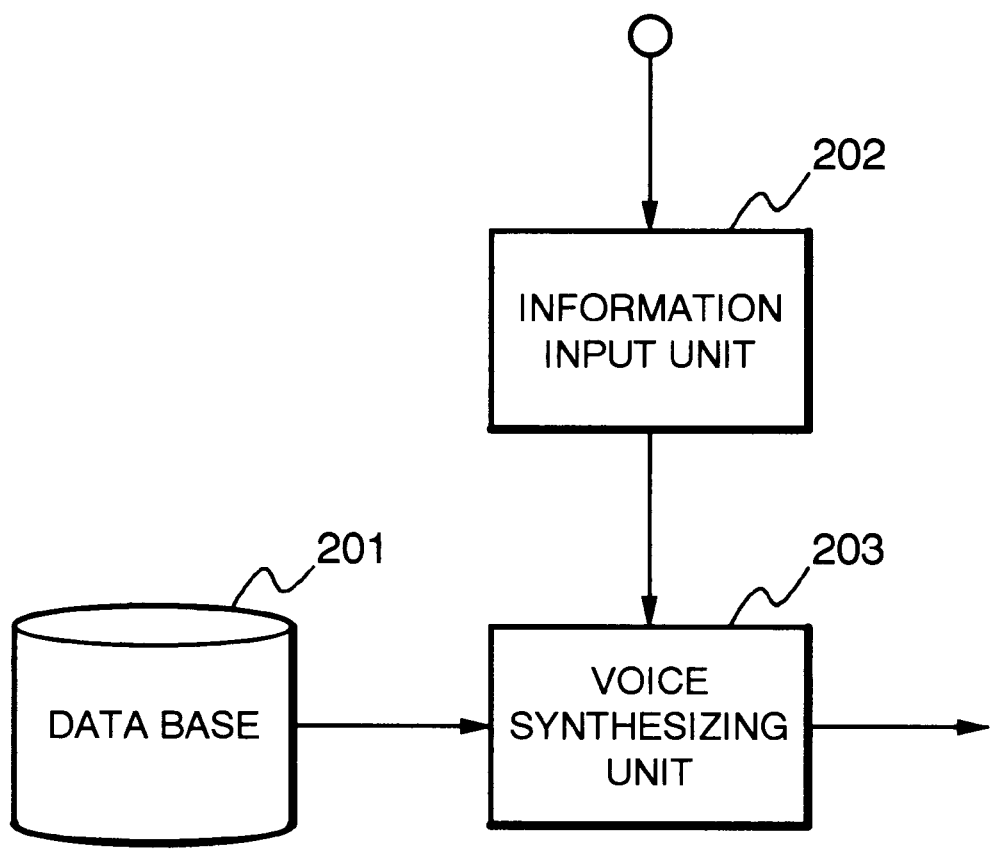
FIG. 2 is a block diagram showing structure of an individual voice data synthesizing unit for use in the present embodiment.

Description will be next made of the individual voice data synthesizing unit 200. One of applicable voice synthesizing techniques for synthesizing individual voice data to be stored in the individual voice data memory 102 of the voice data accumulation unit 100 is, for example, a known voice synthesizing technique disclosed in Japanese Patent Laying Open (Kokai) No. Heisei 4-316100, entitled "Voice Guidance Control System". Structure of the voice synthesizing device disclosed in the literature is shown in FIG. 2. It is assumed that the structure of the individual voice data synthesizing unit 200 according to the present embodiment is the same as that of the voice synthesizing device shown in FIG. 2. With reference to FIG. 2, the voice synthesizing device includes a data base 201 which stores unit voice data, an information input unit 202 for receiving input of information for synthesizing voice data, and a voice synthesizing unit 203 for synthesizing voice data by using unit voice data stored in the data base 201 based on information applied from the information input unit 202. Stored in the data base 201 is unit voice data such as numerals and basic words sounded with a voice quality used in the generation of common voice data or a voice quality familiar to a user, for example, voice of a famous actor. The information input unit 202, which is implemented by an input device such as a keyboard, receives input of information inherent to a user. In the example shown in FIG. 3, "Mary (given name)", "a little girl (sex)" and "New York (address)" are input. The voice synthesizing unit 203 sequentially reads unit voice data corresponding to applied inherent information from the data base 201 to synthesize and output individual voice data to the individual voice data memory 102. The data base 201 may store unit voice data for each voice quality to enable synthesis of voice data using a desired voice quality according to the designation from the information input unit 202.

The structure shown in FIG. 2 is only an example of the structure of the individual voice data synthesizing unit 200 and it is clearly understood that various known voice synthesizing techniques can replace the above-described structure. In addition, it is preferable that individual voice data is synthesized with the same voice quality as that of common voice data or a voice quality familiar to a user by using a voice synthesizing device (individual voice data synthesizing unit 200) as described in the foregoing. The individual voice data synthesizing unit 200, however, is not an essential component of the present embodiment. It is possible, for example, to record voice by the staff by means of a microphone when necessary to store individual voice data in the individual voice data memory 102.

Figure 6:
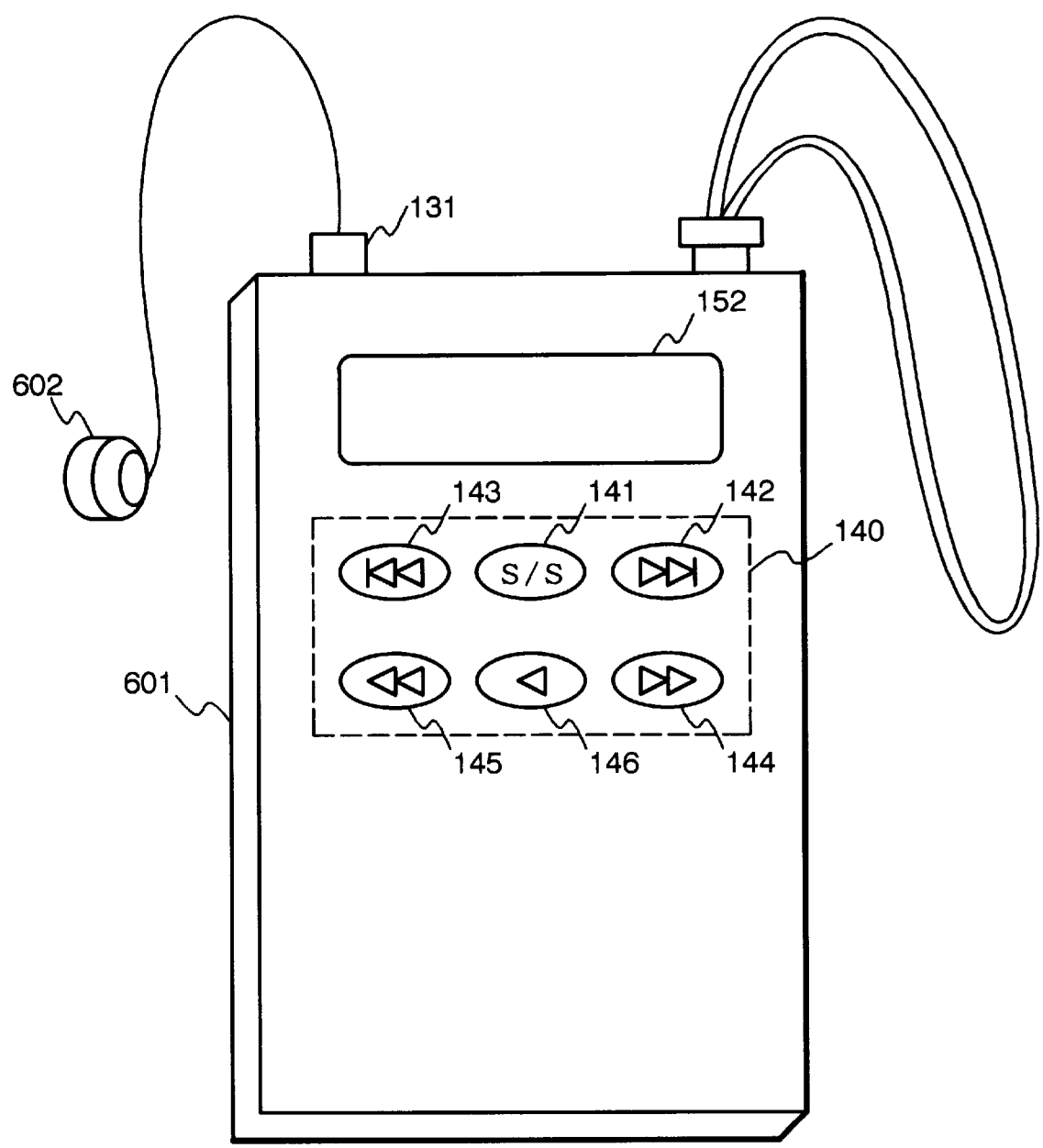
FIG. 6 is an overview of the voice reproduction device shown in FIG. 1 when used as a portable guide apparatus.

Thus structured voice reproduction device of the present embodiment is used for providing a voice guidance at amusement parks, museums and other facilities as mentioned above. In practice use, the device may be distributed to each user as a portable guide apparatus or placed near attractions or exhibits. FIG. 6 is an overview of the voice reproduction device of the present embodiment when used as a portable guide apparatus. With reference to FIGS. 1 and 6 together, provided on the surface of a main body 601 of the voice reproduction device are an operation unit 140 for operating the device and a liquid crystal display panel 152 for displaying visual information.

The operation unit 140 includes operation buttons 141 to 146. The operation button 141 is for starting or stopping voice reproduction operation. The operation buttons 142 and 143 are for selecting a desired data block among a plurality of common voice data blocks C of common voice data. The operation buttons 144 and 145 are for controlling a reading speed of common voice data or individual voice data, the operation button 144 for rapid forward-feeding and the operation button 145 for rapid backward-feeding, in particular. The operation button 146 is for backing a reading position of voice data by the amount of data equivalent to a time period during which the button is being pressed and again reproducing the voice data starting at the backed position.

On the liquid crystal display panel 152, information including present operation state such as the number of a common voice data block C being read and conditions of operation by each operation button is displayed under control of a display control unit 151 shown in FIG. 1. The information is sent to the display control unit 151 from the read control unit 111 of the voice data editing unit 110. This enables a user to operate an operation button according to information displayed on the liquid crystal display panel 152.

On the main body 601 of the voice reproduction device, the output terminal 131 is provided, to which an earphone 602 is to be connected as illustrated in FIG. 6. The user is allowed to listen to a voice message through the earphone 602. It is clearly understood that the output terminal 131 is also connectable to an external speaker or an appropriate audio equipment in place of the earphone 602 to reproduce a voice message.

A voice reproduction device according to another embodiment of present invention will be described in the following. This embodiment will be described with respect to a voice reproduction device for use in a voice publishing apparatus to narrate a story.

Structure of the present embodiment is the same as that of the voice reproduction device according to the first embodiment shown in FIG. 1, with the only difference being that structure of voice data to be stored in the common voice data memory 101 of the voice data accumulation unit 100 is different from that of the voice data in the first embodiment shown in FIG. 3. Structure of the voice data to be stored in the common voice data memory 101 and the individual voice data memory 102 is shown in FIG. 5.

Figure 5:
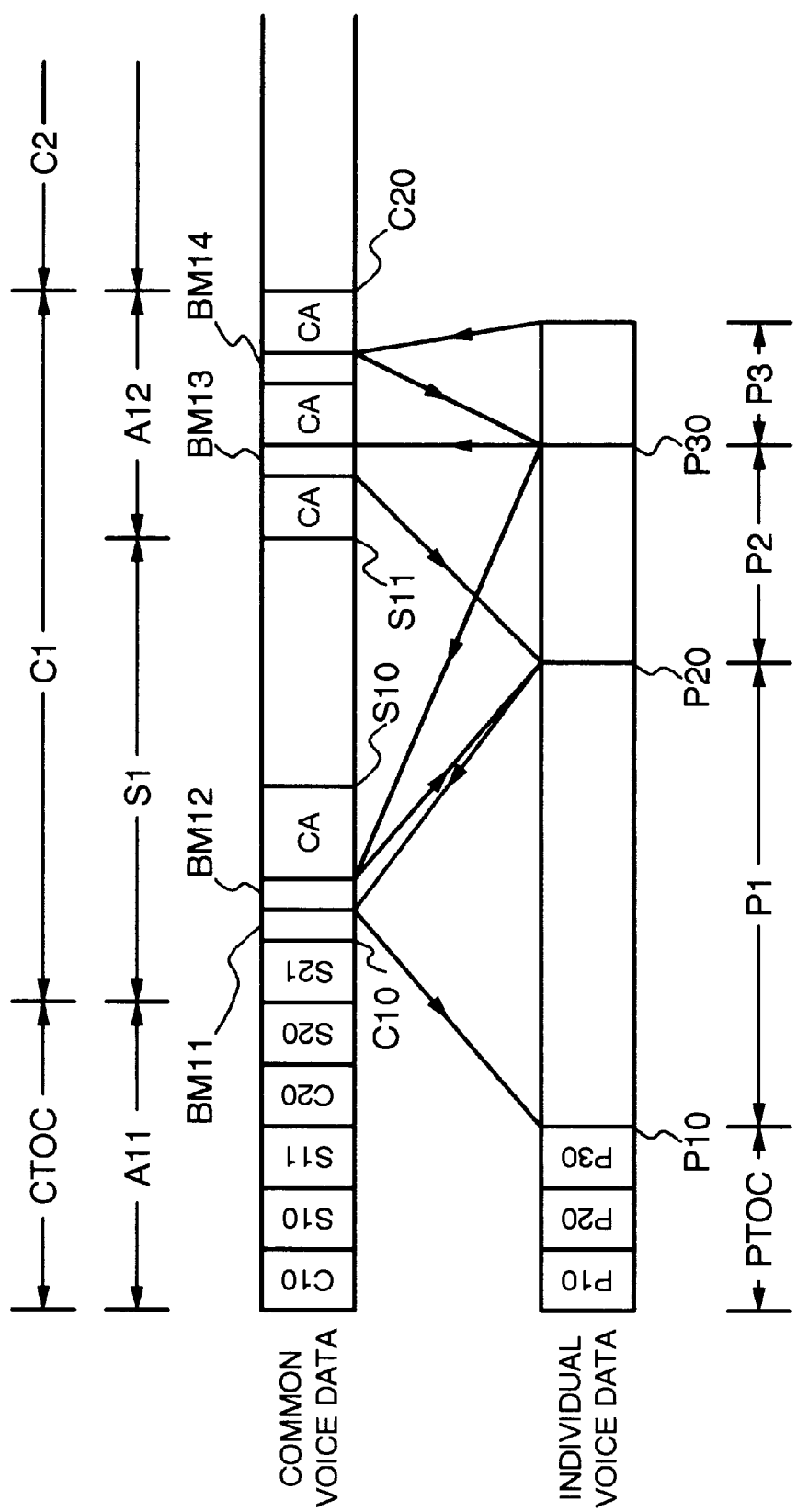
FIG. 5 is a diagram showing data structure of common voice data and individual voice data for use in another embodiment of the present invention.

With reference to FIG. 5, common voice data has CTOC arranged at its top which is followed by a plurality of common voice data blocks C1, C2, . . . arranged in succession. Each common voice data block C is composed of story voice data S which is the contents of a story and additional voice data A to be added before and behind the story voice data S. The additional voice data A is composed of a branch mark BM and an additional voice data piece CA. In the CTOC of the present embodiment, not only address information indicative of a storage position of the common voice data block C but also address information indicative of a storage position of the story voice data S are stored. Since the story voice data S corresponds to the contents of one complete story, it is not desirable that the story is modified by inserting other data into the story or the like. None of the branch mark BM is therefore disposed in the story voice data S.

Individual voice data is similarly structured to the individual voice data of the first embodiment shown in FIG. 3. More specifically, PTOC is arranged at the top, which is followed by an individual voice data piece P. At each item of the PTOC, address information is stored which is indicative of a storage position of the individual voice data piece P.

With the voice reproduction device having thus structured voice data stored in the common voice data memory 101 and the individual voice data memory 102, read of voice data and reproduction of a voice message are conducted under control of the read control unit 111 in the voice data editing unit 110. First, based on information of CTOC read from the common voice data memory 101, a common voice data block C1 is read. Then, upon detection of a branch mark BM11 in additional voice data A11 by the BM detection unit 112, the read of the common voice data is interrupted to start read of an individual voice data piece P1. Upon completion of the read of the individual voice data piece P1, read of the common voice data is again started. After the foregoing operation is repeated to read all of the additional voice data A11, read of story voice data S1 is subsequently started. Since the story voice data S1 includes none of the branch mark BM as mentioned above, the story voice data S1 will be read without interruption, so that voice is reproduced by the voice reproduction unit 120. Upon completion of the read of the story voice data S1, additional voice data A12 is subsequently read. Then, in response to the detection of a branch mark BM13, the read of the common voice data is interrupted to read the individual voice data piece P. The same operation will be repeated hereafter. Then, after the read of the common voice data block C1 and reproduction of voice are completed, the routine proceeds to read of the common voice data block C2 when necessary.

The contents of the additional voice data A are, for example, calling to a listener of a story as a user of the device and book information including introduction of a story. In this embodiment, for example, a mode flag may be set to switch between reproduction and non-reproduction of additional voice data A at the time of reproduction of common voice data. In this case, the read control unit 111 refers to a mode flag before read of common voice data to determine whether additional voice data A is to be reproduced and controls operation to read common voice data from the memory 101 according to the determination result.

As described in the foregoing, since the voice reproduction device of the present invention is capable of incorporating information inherent to a user into a voice message to be reproduced and reproducing the message, the device fully exerts an effect of drawing attention produced by using voice in information communication, thereby drastically improving communication efficiency.

With a user of young age, in particular, by calling the user by his name or nickname, the device is allowed to exert the effect of drawing users' attention to the best.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A voice reproduction device which stores voice data in advance and reads the voice data when necessary for reproducing voice, comprising:

voice data accumulating unit for accumulating voice data of a voice message to be reproduced;

voice data editing unit for controlling said voice data accumulating unit to edit and output voice data accumulated in said voice data accumulating unit; and voice reproducing unit for reproducing voice from voice data output from said voice data accumulating unit and outputting the voice; wherein said voice data accumulating unit comprises a first voice data storing unit for storing voice data of a voice piece common to every user, and a second voice data storing unit for storing voice data of a voice piece prepared individually for each user, wherein between voice data of the respective voice pieces stored in said first voice data storing unit, a branch code is inserted which includes information designating voice data of a voice piece to be read from said second voice data storing unit; and said voice data editing unit controls switching between operation of reading voice data from said first voice data storing unit and that of reading voice data from said second voice data storing unit to sequentially output the read voice data to said voice reproducing unit.

2. The voice reproduction device as set forth in claim 1, wherein said voice data editing unit comprises branch code detecting unit for detecting a branch code from data read from said first voice data storing unit, and read control unit for, when a branch code is detected by said branch code detecting unit, interrupting data reading from said first voice data storing unit to conduct reading of voice data designated by said branch code among voice data stored in said second voice data storing unit and after completing the reading of said voice data from said second voice data storing unit, resuming data reading from said first voice data storing unit.

3. The voice reproduction device as set forth in claim 1, wherein said branch code is a combination of data pieces which will not ordinarily occur among voice data of the respective voice pieces stored in said first voice data storing unit, and said voice data editing unit comprises branch code detecting unit for detecting a branch code from data read from said first voice data storing unit, and read control unit for, when a branch code is detected by said branch code detecting unit, interrupting data reading from said first voice data storing unit to conduct reading of voice data designated by said branch code among voice data stored in said second voice data storing unit and after completing the reading of said voice data from said second voice data storing unit, resuming data reading from said first voice data storing unit.

4. The voice reproduction device as set forth in claim 1, further comprising a buffer memory for temporarily holding voice data read from said first voice data storing unit and then outputting the data to said voice reproducing unit.

5. The voice reproduction device as set forth in claim 1, which further comprises a buffer memory with a storage capacity equivalent to the data size of said branch code for temporarily holding voice data read from said first voice data storing unit and then outputting the data to said voice reproducing unit, and wherein said voice data editing unit comprises branch code detecting unit for detecting a branch code from data read from said first voice data storing unit, and read control unit for, when a branch code is detected by said branch code detecting unit, interrupting data reading from said first voice data storing unit to conduct reading of voice data designated by said branch code among voice data stored in said second voice data storing unit and after completing the reading of said voice data from said second voice data storing unit, resuming data reading from said first voice data storing unit.

6. The voice reproduction device as set forth in claim 1, wherein said branch code is a combination of data pieces which will not ordinarily occur among voice data of the respective voice pieces stored in said first voice data storing unit, and which further comprises a buffer memory with a storage capacity equivalent to the data size of said branch code for temporarily holding voice data read from said first voice data storing unit and then outputting the data to said voice reproducing unit, and wherein said voice data editing unit comprises branch code detecting unit for detecting a branch code from data read from said first voice data storing unit, and read control means for, when a branch code is detected by said branch code detecting unit, interrupting data reading from said first voice data storing unit to conduct reading of voice data designated by said branch code among voice data stored in said second voice data storing unit and after completing the reading of said voice data from said second voice data storing unit, resuming data reading from said first voice data storing unit.

7. The voice reproduction device as set forth in claim 1, further comprising voice data synthesizing unit for synthesizing voice data to be stored in said second voice data storing unit.

8. The voice reproduction device as set forth in claim 1, further comprising voice data synthesizing unit for synthesizing voice data to be stored in said second voice data storing unit, said voice data synthesizing unit comprising a data base for storing unit voice data, information input unit for receiving input of information for the synthesis of voice data, and voice synthesizing unit for synthesizing voice data by using unit voice data stored in said data base based on information input from said information input unit.

9. The voice reproduction device as set forth in claim 1, wherein said voice data editing unit skips read of arbitrary voice data designated when necessary among voice data stored in said first voice data storing unit.

10. The voice reproduction device as set forth in claim 1, wherein the voice data of a voice piece prepared individually for each user is stored in a data base prior to the device being used by any user.

* * * * *